Patented Jan. 26, 1954

2,667,419

UNITED STATES PATENT OFFICE 2,667,419

SUBSTANTIALLY DEHYDRATED FOOD PRODUCTS

Chester M. Gooding, Staten Island, N. Y., Hans W. Vahlteich, Englewood, N. J., and Ralph H. Neal, deceased, late of North Bergen, N. J., by Ethel Neal, administratrix, North Bergen, N. J., assignors to The Best Foods, Inc., New York, N. Y., a corporation of New Jersey No Drawing. Application October 21, 1949, Serial No. 122,854

The portion of the term of the patent subsequent to October 25, 1966, has been disclaimed 14 Claims. (Cl. 99—150)

This invention relates to food products and more particularly to substantially dehydrated food products, such as milk powders, egg powders and dried coconut.

An object of this invention is to retard the deterioration, and retain the flavor and color, of substantially dehydrated food products.

Substantially dehydrated food products, such as dehydrated egg powder, manifest marked deterioration over relatively short periods of time, particularly when exposed during storage to temperatures exceeding 45° F. This deterioration is indicated by flavor, color and odor changes. While the maintenance of such substantially dehydrated food products at low temperatures retards this deterioration, it is frequently not feasible to store continually products at these low temperatures. This difficulty is especially encountered when such substantially dehydrated food products are components in mixtures of food products such as cake mixes.

In accordance with this invention, substantially dehydrated food products, such as egg powders, are provided, which do not manifest the marked change in color, flavor or odor, particularly when exposed for relatively long periods to temperatures above 45° F. The substantially dehydrated food products of this invention have incorporated in them 0.001 to 0.2% and preferably 0.008 to 0.05%, of a mono-aliphatic citrate, and more particularly of a mono-alkyl or mono-alkylene citrate. The aliphatic group in the mono-aliphatic citrate may contain any number of carbon atoms, although it is desirable that the number of carbon atoms be not more than 18.

The mono-aliphatic citrate may be incorporated in the food product in any suitable manner. Conveniently, the mono-aliphatic citrate is incorporated in the food product prior to dehydration. For example, sufficient mono-aliphatic citrate is added to milk, which may be whole milk or skim milk, prior to the dehydration of the milk by spray-drying or other conventional means of producing substantially dehydrated milk powder. Or again, the aliphatic citrate may be incorporated in dehydrated shredded coconut by spraying the shredded coconut with the mono-aliphatic citrate or a solution or emulsion thereof before dehydration. The shredded coconut may then be dehydrated in the conventional manner.

The mono-aliphatic citrates which are incorporated in the food products of this invention may be prepared by methods described in U. S. Patents 2,485,631, 2,485,632 and 2,485,633. In incorporating the mono-aliphatic esters, the esters per se may be used or a solution or emulsion of the esters may be employed. For example, for some purposes, a mono-aliphatic citrate in which the aliphatic group has not more than 12 carbon atoms may be dissolved in water and the resulting aqueous solution used for incorporating the mono-aliphatic citrate in the food product. Other solvents of the mono-aliphatic ester may be employed instead of water, for example, monohydric or polyhydric alcohols, such as ethyl alcohol, propylene glycol, glycerine or sorbitol; ketones, such as acetone; or derivatives of polyhydric alcohols, such as mono- and di-glycerides of monocarboxylic acids.

One or a plurality of mono-aliphatic citrates may be employed in the food products of this invention. The amount of mono-aliphatic citrates, however, should be within the limits of 0.001 to 0.2%, and preferably within the range of 0.008 to 0.05%, by weight of the final substantially dehydrated food product. The substantially dehydrated food product usually contains a small quantity of water. For example, milk powder ordinarily contains from about 2 to 5% of water, while egg powder frequently contains 4% or more of water. The percentage of mono-aliphatic citrate in the food product is calculated on the final substantially dehydrated food product which as heretofore discussed may contain a small amount of water.

Examples of the mono-alkyl and mono-alkylene citrates which may be incorporated in the food products of this invention are the citric acid mono-esters of the following alcohols: ethanol, propanols, octanols, decanols, dodecanols, hexadecanols, octadecanols, eicosanols, docosanols, octenols, decenols, dodecenols, hexadecenols, octadecenols, eicosenols and docosenols.

A more comprehensive understanding of this invention is obtained by reference to the following examples:

Example 1.—Egg yolk powder having incorporated therein mono-isopropyl citrate

Forty pounds of water is added to 400 lbs. of freshly separated egg yolks. To this mixture is added 0.06 lb. of a solution of mono-isopropyl citrate, di-isopropyl citrate and tri-isopropyl citrate dissolved in mono- and di-glycerides of the fatty acids obtained from corn salad oil. The solution of the mixture of mono-isopropyl, di-isopropyl and tri-isopropyl citrates in the mono-glycerides is obtained by dissolving 38 parts of a mixture of mono-isopropyl, di-isopropyl and tri-isopropyl citrates containing about 60% mono-isopropyl citrate, about 35% of di-isopropyl citrate and about 5% of tri-isopropyl citrate in about 62 parts of the mono- and di-glycerides. The mixture of mono-isopropyl, di-isopropyl and tri-isopropyl citrates is prepared as described in Example 2 of U. S. Patent 2,485,631.

The resulting mixture of fresh egg yolks, water and the solution containing mono-isopropyl citrate is agitated for a few minutes to insure a uniform mixture of the ingredients and is then processed through a conventional spray drier. One convenient type of drier for this purpose comprises a chamber with a spray mechanism, a heated air stream and means for removing the product from the chamber in a continuous manner. Depending upon the efficiency of the spray drying equipment, the amount of moisture in the resulting dehydrated product may be from about 1 to 5%.

*Example 2.—Deheydrated whole egg powder having incorporated therein mono-ethyl citrate*

To 40 lbs. of water is added 0.05 lb. of a mixture of mono-ethyl citrate, di-ethyl and tri-ethyl citrate containing about 75% mono-ethyl citrate, 20% of di-ethyl citrate and the remainder tri-ethyl citrate. When the mixture of ethyl citrates is dissolved in the water, the resulting solution is added to 400 lbs. of freshly separated whole eggs (or frozen whole eggs) while stirring. The resulting product is then processed through a spray drier in the same manner as described in Example 1. The resulting dehydrated whole egg powder may contain from 1 to 5% of moisture depending upon the particular conditions of spray drying.

The mixture of mono-ethyl citrate, di-ethyl citrate and tri-ethyl citrate is prepared as described in Example 9 of U. S. Patent 2,485,632.

*Example 3.—Substantially dehydrated egg white powder containing mono-n-propyl citrate*

To 500 lbs. of fresh egg whites are added 45 grams of a mixture of mono-n-propyl citrate, di-n-propyl citrate and tri-n-propyl citrate containing about 60% of mono-n-propyl citrate, 35% of di-n-propyl citrate and the remainder tri-n-propyl citrate. The resulting mixture is then processed in a conventional spray drier to obtain a dehydrated product. The mixture of the mono-n-propyl citrate, di-n-propyl citrate and tri-n-propyl citrate is produced in the same manner as the mixture of isopropyl citrates used in Example 1, except that n-propyl alcohol is employed instead of isopropyl alcohol.

*Example 4.—Substantially dehydrated skim milk powder containing mono-stearyl citrate*

Three grams of substantially pure mono-stearyl citrate are dissolved at 140° F. in 300 grams of isopropyl alcohol. The isopropyl alcohol solution is added to 1,000 lbs. of skim milk heated to a temperature of about 140° F. The substantially pure mono-stearyl citrate may be prepared by the process described in Example 1 of U. S. Patent 2,485,633. After the addition of the mono-stearyl citrate, the skim milk is agitated to insure the uniform distribution of the mono-stearyl citrate throughout the body of the skim milk. The skim milk is then processed in a conventional spray drier to obtain the substantially dehydrated skim milk powder containing mono-stearyl citrate.

*Example 5.—Substantially dehydrated whole milk powder containing mono-oleyl citrate and mono-stearyl citrate*

1,000 lbs. of fresh whole milk are heated to a temperature of about 140 to 160° F. and 50 grams of a mixture of mono-oleyl citrate, di-oleyl citrate, tri-oleyl citrate, mono-stearyl citrate, di-stearyl citrate and tri-stearyl citrate together with mixed oleyl and stearyl citrates are added to it. The mixture of citrates contains about 10 to 15% of mono-esters, about 50% of di-esters and the remainder tri-esters of citric acid and is prepared in accordance with the method described in Example 5 of U. S. Patent 2,485,634. The mixture of skim milk and the citrates is agitated sufficiently to insure the uniform distribution of the citrates throughout the body of the whole milk. The whole milk is then processed in a conventional spray drier to produce the substantially dehydrated whole milk powder. Alternatively, the whole milk powder may be processed on a drum drier to produce a substantially dehydrated whole milk powder.

*Example 6.—Shredded coconut having incorporated therein mono-lauryl citrate*

500 lbs. of shredded coconut are sprayed with an aqueous emulsion of mono-lauryl citrate, di-lauryl citrate and tri-lauryl citrate at the rate of 4 lbs. of the emulsion per 100 lbs. of shredded coconut. The aqueous emulsion of the mono-lauryl, di-lauryl and tri-lauryl citrates is prepared by emulsifying a mixture of the lauryl citrates in warm water (130° F.) to form a 10% emulsion. The mixture of mono-lauryl, di-lauryl and tri-lauryl citrates is prepared in accordance with the method described in Example 2 of U. S. Patent 2,485,634, and the mixture contains about 10 to 15% of mono-lauryl citrate, about 50% di-lauryl citrate and the remainder tri-lauryl citrate. The resulting shredded coconut is then dried in any conventional manner. Alternatively, the aliphatic citrates may be incorporated in the shredded coconut by dipping shredded coconut in a solution or emulsion containing the alkyl or alkylene citrates and then draining and drying the impregnated shredded coconut.

The terms and expressions which we have employed are used as terms of description and not of limitation and we have no intention, in the use of such terms and expressions, of excluding any equivalents of the features described but recognize that various modifications are possible within the scope of the invention claimed.

What is claimed is:

1. A substantially dehydrated food product having incorporated therein 0.001 to 0.2% of a monoaliphatic citrate selected from the class consisting of mono-alkyl citrates and mono-alkylene citrates.

2. A milk powder having incorporated therein 0.001 to 0.2% of a member selected from the class consisting of mono-alkyl citrates and mono-alkylene citrates.

3. An egg powder having incorporated therein 0.001 to 0.2% of a member selected from the class consisting of mono-alkyl citrates and mono-alkylene citrates.

4. Dried coconut having incorporated therein 0.001 to 0.2% of a member selected from the class consisting of mono-alkyl citrates and mono-alkylene citrates.

5. A substantially dehydrated food product having incorporated therein 0.008 to 0.05% of a member selected from the class consisting of mono-alkyl and mono-alkylene citrates.

6. Milk powder having incorporated therein 0.008 to 0.05% of a mono-alkyl citrate.

7. Egg powder having incorporated therein 0.008% to 0.05% of a mono-alkyl citrate.

8. Milk powder having incorporated therein 0.008 to 0.05% of a mono-alkylene citrate.

9. Milk powder having incorporated therein 0.001 to 0.2% of mono-stearyl citrate.

10. Egg powder having incorporated therein 0.001 to 0.2% of mono-isopropyl citrate.

11. Shredded coconut having incorporated therein 0.001 to 0.2% of mono-lauryl citrate.

12. The method of producing a substantially dehydrated food product, said method comprising incorporating in said product a mono-aliphatic citrate selected from the class consisting of mono-alkyl citrates and mono-alkylene citrates.

13. The method of producing a substantially dehydrated food product, said method comprising incorporating in said product a mono-aliphatic citrate in which the aliphatic group has not more than 18 carbon atoms, said mono-aliphatic citrate being selected from the class consisting of mono-alkyl citrates and mono-alkylene citrates.

14. The method of producing a substantially dehydrated food product, said method comprising incorporating in said product prior to dehydration a mono-aliphatic citrate selected from the class consisting of mono-alkyl citrates and mono-alkylene citrates.

CHESTER M. GOODING.
HANS W. VAHLTEICH.
ETHEL NEAL.
Administratrix for the estate of Ralph H. Neal, deceased.

References Cited in the file of this patent

UNITED STATES PATENTS

| Number | Name | Date |
|---|---|---|
| 1,444,408 | Willison | Feb. 6, 1923 |
| 1,627,342 | Sabalitschka | May 3, 1927 |
| 1,929,691 | Hutteman | Oct. 10, 1933 |
| 2,117,478 | Hall | May 17, 1938 |
| 2,182,209 | Newton et al. | Dec. 5, 1939 |
| 2,319,362 | Wouters | May 18, 1943 |
| 2,338,184 | Kaufman | Jan. 4, 1944 |
| 2,358,324 | Frey et al. | Sept. 19, 1944 |
| 2,485,632 | Vahlteich et al. | Oct. 25, 1949 |
| 2,485,633 | Gooding et al. | Oct. 25, 1949 |
| 2,485,635 | Neal et al. | Oct. 25, 1949 |